BERNARD T. HENSGEN
DONALD KENNETH JEWELL
INVENTORS

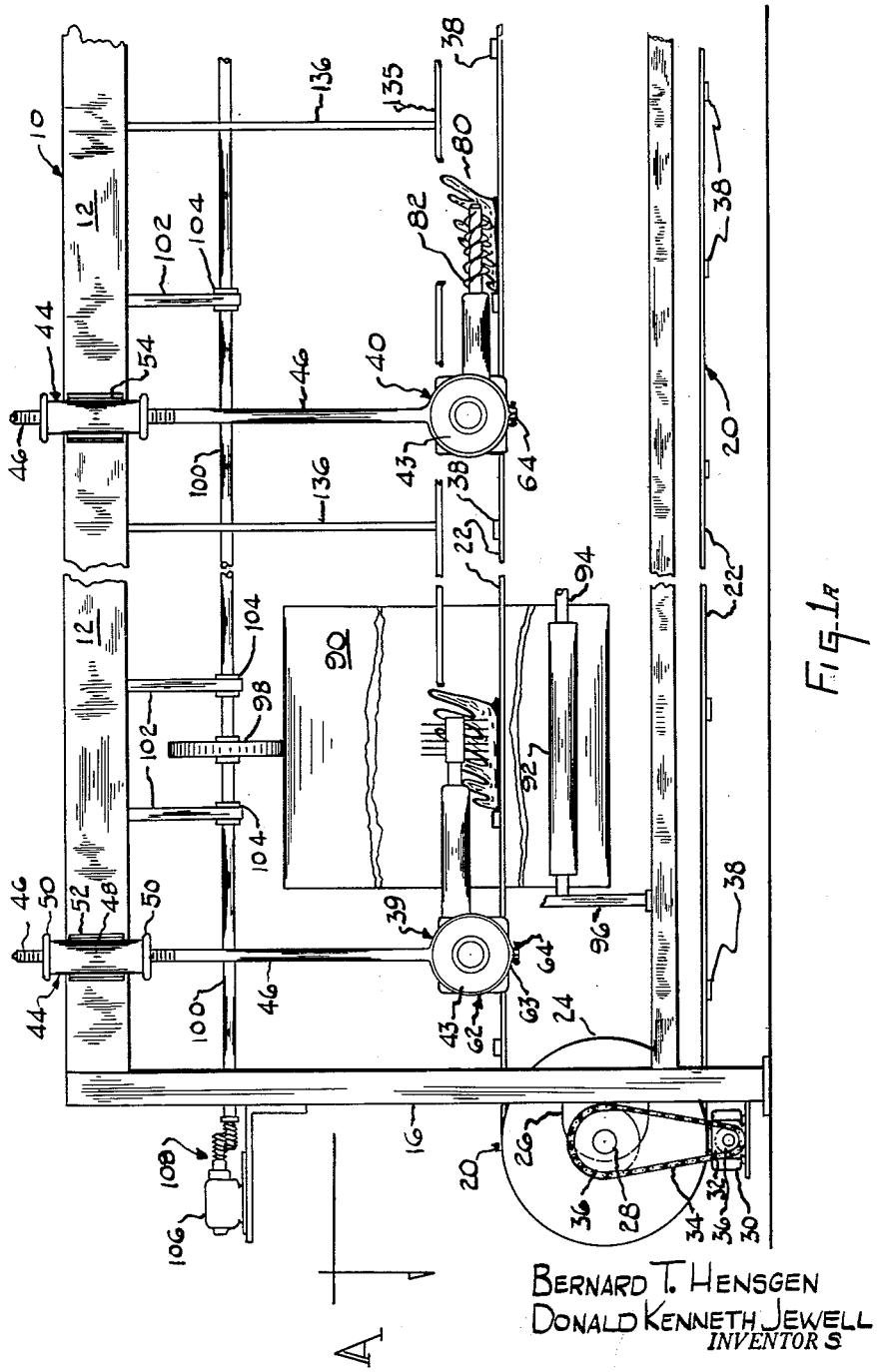

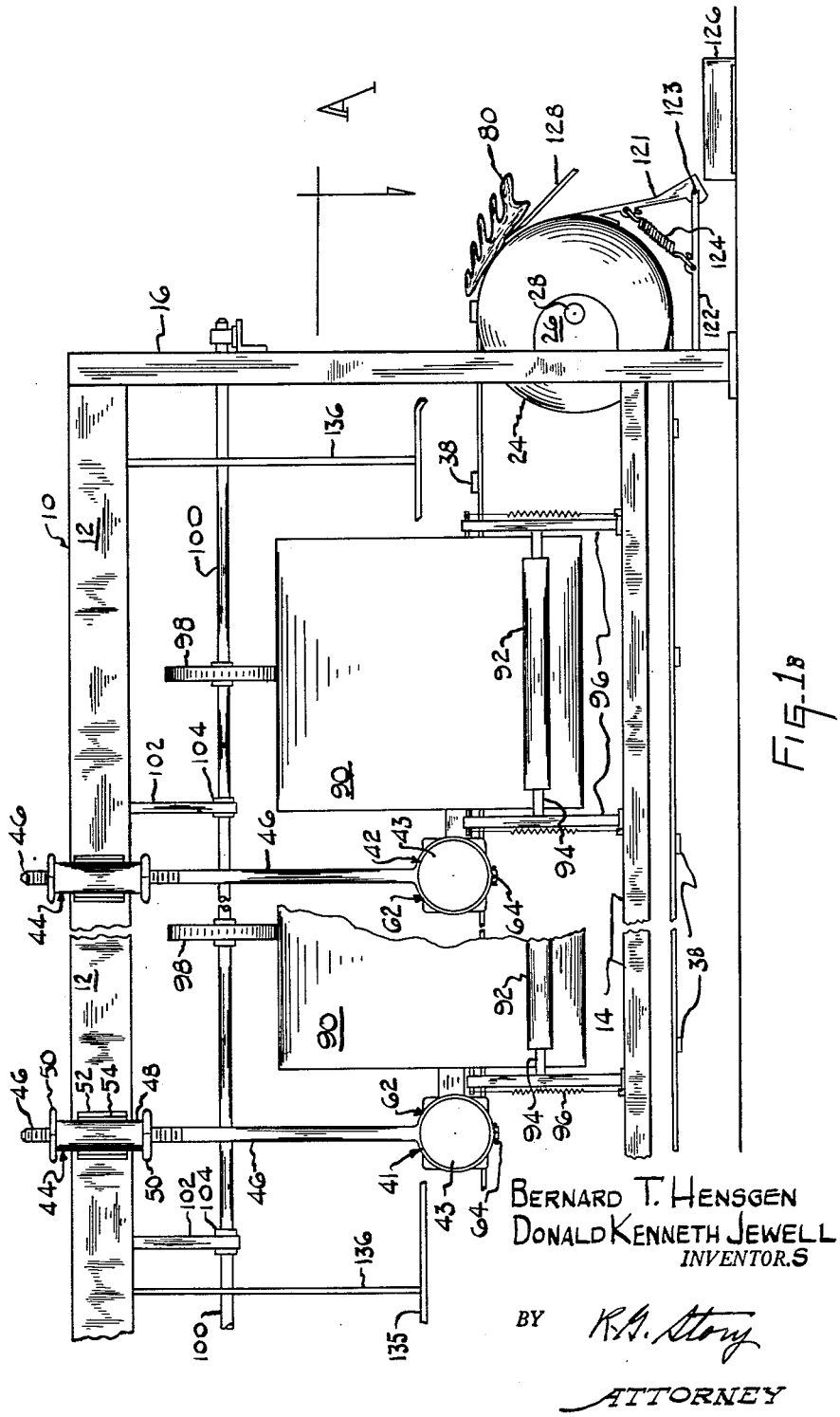

BY R.A. Story
ATTORNEY

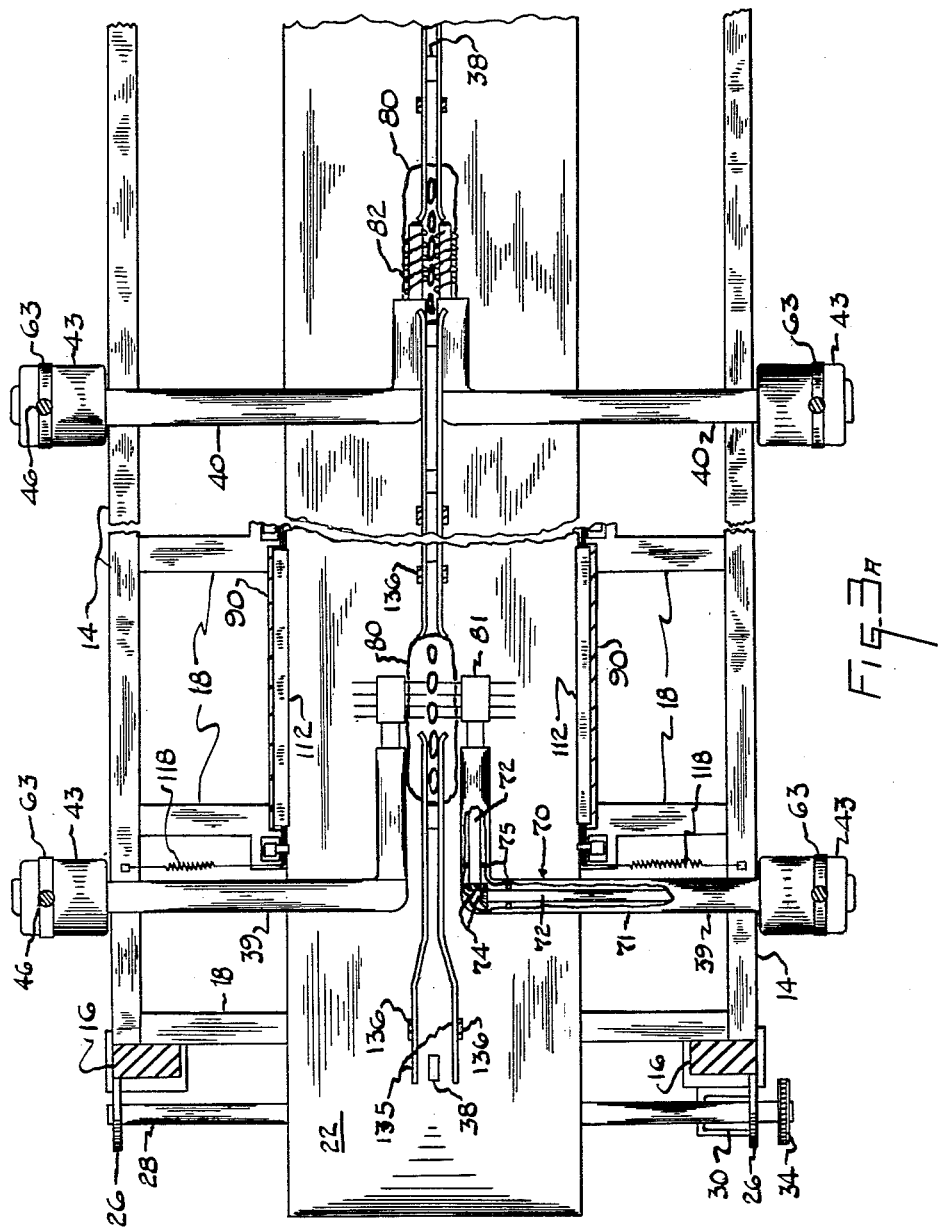

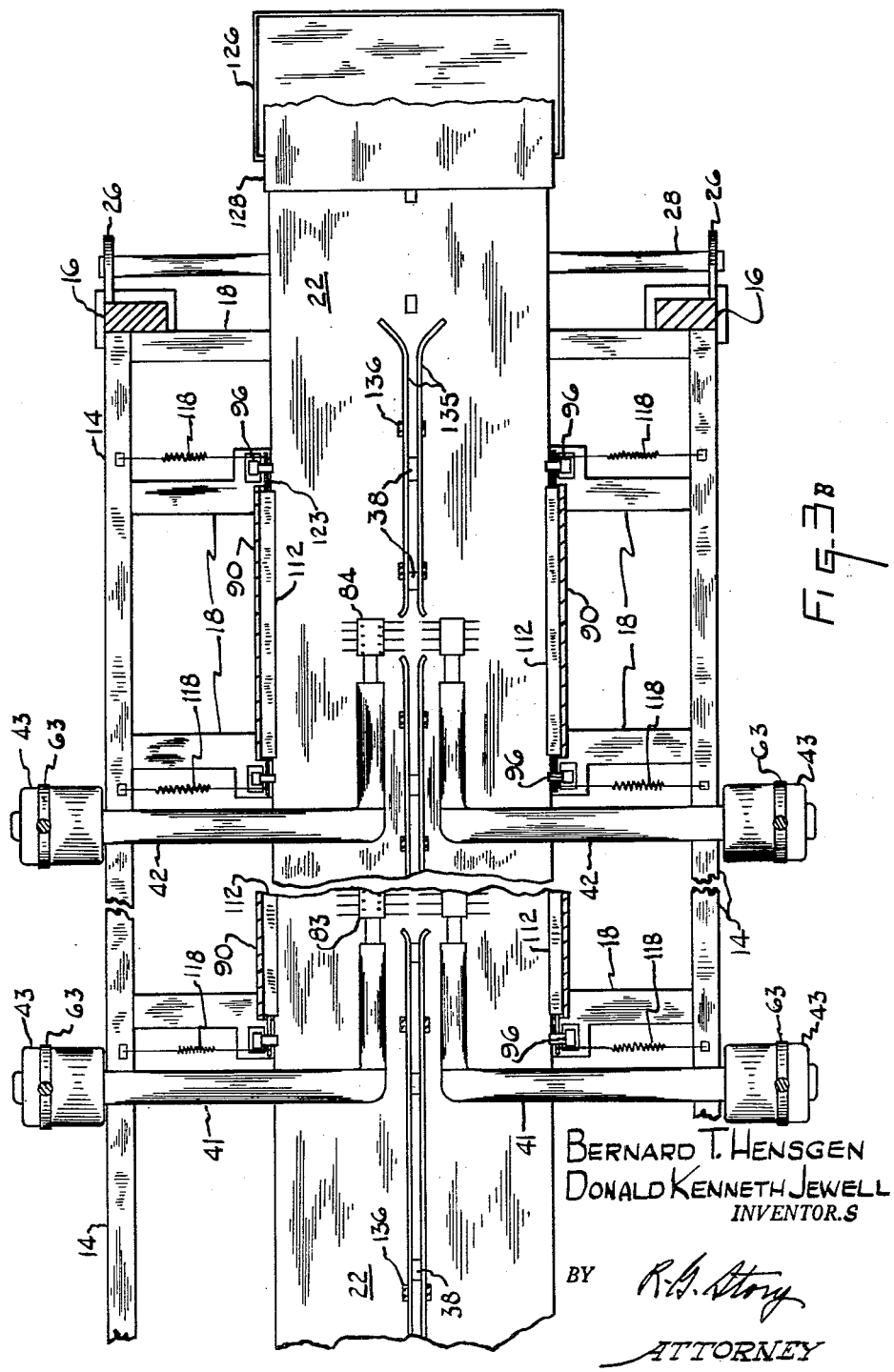

United States Patent Office 3,154,804
Patented Nov. 3, 1964

3,154,804
APPARATUS FOR REMOVING MEAT FROM BONES
Bernard T. Hensgen, Highland Park, and Donald Kenneth Jewell, Chicago, Ill., assignors to Swift & Company, Chicago, Ill., a corporation of Illinois
Filed Apr. 3, 1961, Ser. No. 100,234
8 Claims. (Cl. 17—1)

The present invention relates to the recovery of meat from bones, and more specifically to an improved method and apparatus for automatically removing residual meat which adheres to bones after an initial boning operation.

In the dressing of most meat yielding animals, large quantities of bones are produced to which a considerable amount of meat adheres after the primary cuts are removed from the carcass. Those engaged in the meat industry have long recognized the potential economic value of this residual meat and have consequently suggested various procedures by which it may be recovered.

Traditionally, residual meat has been removed by hand scraping of the bones with a knife or similar instrument. Over the years it has been further suggested that residual meat could be more easily removed by methods which involve either chemical treatment or the application of a specific labor saving apparatus. In chemical treatment methods, the residual meat adhering to the bones is often loosened or entirely removed by either boiling the bones and meat in water until the meat is softened and falls off, or more recently, by a process involving the enzymatic breakdown of the meat through the use of proteolytic enzymes. Since in the boiling or enzymatic treatment of meat inherently causes breakdown of the fibrous structure usually associated with meat, these chemical methods have been successfully used only where the final product is to be used in the formulation of a product wherein the original structure of the meat is of little or no significance.

Mechanical methods which have been tried with varying degrees of success have heretofore been more or less limited to variations of the traditional hand scraping technique. It has been suggested that meat could be more easily removed from bones by the hand application of individual bones to the surface of a power driven brushing wheel. While this method will yield meat having sufficient quality for incorporation in comminuted food products such as sausage and so forth, what with today's high labor costs, it has been found the amount of labor expended in holding bones in contact with rotating brushes is often more expensive than the value of the meat obtained.

It is therefore an object of the present invention to provide an improved method and apparatus which will quickly and economically remove residual meat from bones.

It is another object of this invention to provide an improved method and apparatus which will automatically remove residual meat from bones, and which requires a minimum of manual control.

It is still a further object of this invention to provide an improved method and apparatus for recovering the meat adhering to bones after a preliminary boning operation in a form suitable for direct incorporation into comminuted meat products.

It is yet another object of this invention to provide an apparatus which can be readily adapted to automatically remove residual meat from bones having a variety of shapes and sizes.

These and still other objects of the invention will become readily apparent to one skilled in the art from the following detailed description of the invention.

Generally, the present invention contemplates substantially continuous rotary cutting and brushing, to respectively loosen and strip residual meat from bones, at zones spaced along a path through which bones are serially transported; and the collection of stripped meat at such zones. A conveying means is adapted to receive and hold a bone having residual meat adhering thereto and to carry said bone past and in contact with a plurality of rotating knives and brushes which act to loosen and/or remove the meat from the bones. The patterning or positioning of the brushes and knives is such that a knife and/or brush will contact every area of the bone to which meat is adhering. In general, for a bone having a complex shape, a series of brushes mounted at varying angles and distances from the conveying means is required. Means are provided to collect the meat as it is scraped or brushed from the bone passing by the contacting brushes or knives.

Both the method and apparatus of the present invention will be better explained by the following description of an embodiment of the apparatus and the accompanying drawings wherein:

FIGURES 1A and 1B are front elevations of the invention with parts broken away and parts omitted for clarity;

FIGURES 3A and 3B are overhead views of the apparatus as shown in FIGURES 1A and 1B through section A—A with parts broken away and omitted.

Figure 2:
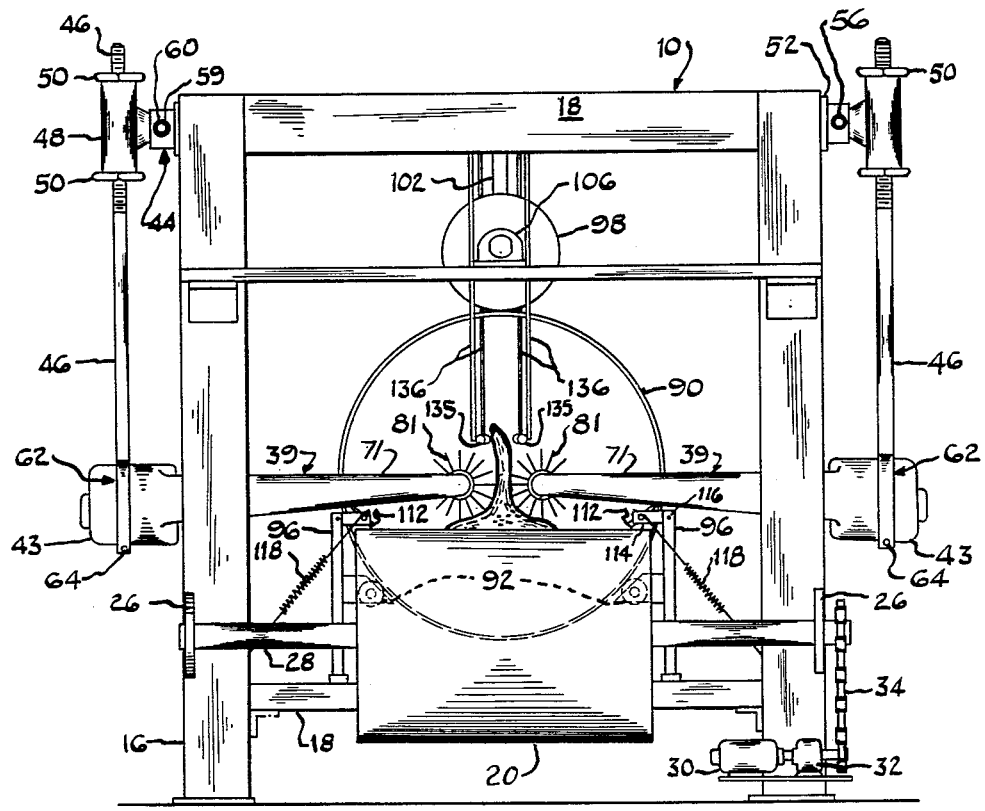
FIGURE 2 is a side elevation from the left side of the apparatus of FIGURE 1.

According to the method of this invention, a plurality of bones, having quantities of residual meat adhering thereto, are conveyed along a given path and operated upon at a number of zones or stations to loosen and strip such meat therefrom. These operations comprise specifically continuous cutting and brushing of the meat. At least one cutting operation is carried out in advance of final brushing. However, it is not necessary that a cutting operation precede each brushing, or that cutting be the very first operation. In fact it is preferred that the meat is first brushed, then cut, and finally exposed to a plurality of further brushing operations.

Collectively the brushing operation should cover the entire surface area of the bones to which meat normally adheres. Each separate brushing step however need not contact the entire surface, and preferably at least one brushing need only contact a relatively confined area whereby a more concentrated and effective stripping of the meat is obtained. Normally the cutting operations are only carried out on areas of the bones where the residual meat more firmly adheres to the bone, or occurs in relatively large amounts, or where the bone structure tends to protect the meat. Such cutting step, or steps, may be followed by a brushing operation that concentrates the brush action in the general area of cutting. Accordingly it is necessary to maintain the bones in a generally upright attitude so as to expose the residual meat to these operations; and also it is preferable to arrange the respective cutting and brushing means in the most advantageous sequence for a particular type of bone to obtain maximum efficiency.

The meat stripped from the bones at the brushing zones is collected and preferably conveyed substantially along the path of the bones in a ribbon that may be inspected, for instance to detect the presence of foreign objects, bone shreds, or otherwise unfit product. At the end of the path the bones are diverted, and the stripped meat recovered and stored for use in products requiring substantially raw comminuted meat.

Referring to the drawings in general, there is illustrated a device having a frame generally 10, which consists of two longitudinal top members 12, a pair of longitudinal side members 14, four vertical end members 16, and a series of horizontal cross members 18 which interconnect with the longitudinal top members 12 and the side members 14 at various points along their length.

Shown in FIGURES 1 and 2 as being disposed approximately midway the heighth of the vertical members 16 and running essentially the total length of the frame 10, is a continuous conveyor generally 20. The conveyor 20 comprises a flexible belt 22 trained about two rotating drums 24, each drum 24, in turn, is supported upon an axle 28 journaled in a pair of flanges 26 secured to the end member 16. A driving motor 30 is operatively connected to one of the drums 24 through a gear reduction transmission generally 32 and a chain 34 passing over a pair of sprockets 36. The conveyor belt 22 is provided with a series of bone pushing lugs 38 located at varying intervals along the length of the belt 22.

As shown in FIGURES 1 and 3, there are spaced along the longitudinal frame members 12 of frame 10, four pairs of identical brush or knife driving means generally 39, 40, 41 and 42. It is seen that each of the four pairs of identical brush or knife driving means 39, 40, 41 and 42 comprise an electric motor 43 suspended from longitudinal top member 12 by means of a pivot mount assembly generally 44.

It should be noted that each member of each pair of brush driving means 39, 40, 41 and 42 is essentially identical to the other except for the type and size brush or knife carried by each, and except for the fact that they are adapted to be mounted on either the right or left hand side of the apparatus. Therefore, the following description of the brush driving means which may be designated as the right hand member of pair 39 will apply to the rest. The right hand member of the brush driving means 39 is suspended from the longitudinal top member 12 by means of the pivot mount assembly 44 which comprises an elongated vertical support 46 adjustably attached at its upper end to a vertical bushing member 48. Adjustment of the vertical support 46 within the bushing member 48 is provided by a pair of adjusting nuts 50. Assembly 44 is supported on a mounting plate 52 attached to top member 12. Attached to the plate 52 are a pair of perpendicular flanges 54 between which is located a horizontal bushing member 56 supported between the flanges 54 by a threaded rod 59 and adjustably held in place by a pair of nuts 60. The vertical bushing member 48 is affixed at right angles to horizontal bushing member 56 at approximately midway its length.

The lower extremity of elongated vertical support 46 is affixed at an adjustable motor bracket generally 62. Adjustable motor bracket 62 consists of a circular shape strap member 63 which surrounds the electric motor 43 and is adjustably held in place or tightened about the electric motor 43 by a bolt and nut 64.

Attached to the end of electric motor 43, which faces the conveyor belt 22 as observed in FIGURE 3, is a right angle tool mount generally 70. Right angle brush mount 70 comprises a right angle tubular member 71 which is hollow and in which is mounted a pair of power transmitting shafts 72 connected at right angles to each other by a pair of bevel gears 74. The shafts 72 and bevel gears 74 are maintained in proper alignment and spacing by means of two pairs of bearings 75 mounted within the tubular member 71. On the end portion of shaft 72, which extends beyond right angular tubular member 71, is mounted a rotary tool of suitable size and dimension, such as brush 81 on driving means 39.

In the specific embodiment of the invention, presently illustrated, the apparatus is set up to handle a symmetrically shaped loin bone 80. In this case, since the bone is symmetrically shaped, each tool of a pair operated by the four pairs of driving means 39, 40, 41 and 42 are of the same size and shape, however, each of the pairs chosen to remove the meat from this particular T-shaped loin bone have different sizes. It is seen in FIGURE 3 that the first pair of driving means 39 is provided with the rather large diameter pair of brushes 81; the next pair of driving means 40 to the right is provided with a pair of helical knives 82; the next pair of driving means 41 is provided with a pair of medium sized brushes 83; and the last pair of driving means 42 is provided with a small pair of brushes 84. It should be understood that both the size and the shape of brushes and/or knives used to remove meat from a particular type of bone will vary the size and shape of that particular bone and is determined by means of a practical trial. In that way, the most efficient shape and size of brush and knife for a given bone may be determined. It should also be understood that numbers of pairs of brush-knife driving means may be varied, the number being dependent upon the complexity and size of the bone being operated on.

It is seen that through the use of pivoting assembly 44 the positions of the brushes mounted at the end of right angle brush mount 70 may be varied up, down, across and sideways in order to obtain the most advantageous contact position with the bone being treated.

Reference particularly to FIGURES 1 and 2 will disclose that each of brush pairs 81, 83 and 84 are surrounded by collector drums 90. The function of the drums 90 is to collect the loose meat materials dispersed outwardly by the rotating brushes. Each of the collector drums 90 is supported by a pair of support rollers 92 which are rotatably mounted about axles 94. The axles 94 are supported by a bracket plate 96 mounted on a frame cross member 18 extending between longitudinal side members 14. The collector drums 90 are free to rotate on their respective rollers 92 and are driven through a driver wheel 98 mounted on a shaft 100 which extends the length of the frame 10 and is supported therefrom by hanger supports 102 and bearing 104. The shaft 100 is rotated by a drum driving motor 106 connected to the shaft 100 by a worm gear generally 108.

Meat collected by the drums 90 is removed therefrom by means of drum scraping blades 112 which contact the collector drums 90 throughout their lengths and are maintained against the inner surface of the drums 90 by means of bracket members 114. The bracket members 114 are pivotably mounted to the bracket plates 96 by means of pins 116 as shown in FIGURE 2. Springs 118 stretched between the pivoted bracket members 114 and the longitudinal frame side member 14 maintain the scraper blades 112 in constant contact with the inner surface of the collector drums 90. The scraper blades 112 are slanted downwardly from the wall of the collector drums 90 toward the surface of the conveyor belt 22. It is seen that as meat is collected from the surface of the collector drums 90 it is directed downwardly to the surface of the conveyor belt 22 from which it is subsequently collected.

Meat collection from conveyor belt 22 is achieved by conveyor scraper blade 121 mounted in contact with the conveyor belt 22 at its rear most portion as it emerges from the frame 10 (the right hand side as observed in FIGURE 1). The conveyor scraper blade 121 is maintained in contact with conveyor belt 22, as it passes over right hand drum 24 by means of a bracket 122 extending from the right hand vertical end members 16 as seen in FIGURE 1. Scraper blade is pivoted from the bracket 122 by means of a pin 123 and is maintained in constant contact with belt 22 by means of a spring 124 stretched between the blade 121 and the bracket 122. The meat, as it emerges from the apparatus on the top of the belt 22, is scraped off by the scraper blade 121 and directed downwardly into meat collection box 126, positioned directly scraper blade 121.

Located slightly above the collector blade 121 and positioned a distance from the surface of belt 22 sufficient to allow the passage of meat collected thereon beneath, is a bone collector slide 128. As seen in FIG- URE 1, the bone 80, after having been stripped of meat, will pass off the end of the conveyor and will slide down the slide 128 by virtue of gravity.

Extending longitudinally above the belt 22 are a pair of discontinuous bone guide rails 135 supported by hangers 136 extending down from the horizontal cross members 18 of frame 10. The bone guide rails 135 are spaced a distance which allows the uppermost portions of the loin bone 80 to come in contact therewith. The purpose of the guide rails is to maintain the bone in the proper alignment on the belt 22 throughout its trip through the apparatus. The position of the guide rails 135 may be altered for purposes of positioning and guiding a bone of a shape different than loin bones 80 as shown in the present embodiment. In fact, the guide rails 135 may be completely eliminated providing the bone is securely affixed to the belt 22.

In the operation of the presently described embodiment, the loin bone 80 to which is attached residual meat is positioned on the left hand end of conveyor belt 22 as shown in FIGURE 1 with the rear most portion of said bone positioned against the bone driving lug 38. The bone is positioned so that its highest most projecting rib is located between the bone guide rails 135. As the conveyor passes from left to right in the apparatus as shown in FIGURES 1 and 3, the loin bone 80 is first brought into contact with the large brushes 39. These large brushes 39 remove the meat adhering to the uppermost and lowermost portions of the bone 80. The bone is next conveyed to the pair of spiral or circular knives 82 which contact the loin bone 80 at the sinew pockets thereof and loosen the meat therein. The bone is then continuously carried to the next set of medium size brushes 83 wherein the meat adhering between the bone projections is swept off. The bone finally comes in contact with the small brushes 84 which remove the meat adhering from the sinew pockets previously loosened by circular knives 82. At every station or point where brushing of the meat on the bone takes place, the meat is swept outwardly, and is collected on the inner surface of the collector drums 90. The meat particles are removed from the collector drums 90 by means of the scraper blades 112 which scrape and direct the meat downwardly onto the belt 22. The belt 22 is continuously moving and carries both bone and dislodged meat supported thereon to the right hand end of the apparatus as shown in FIGURES 1 and 3. As previously described, the stripped bone 80 is picked off the conveyor belt by means of the bone collector slide 128. The meat adhering to the surface of the conveyor belt 22 passes beneath the collector slide 128 and is scraped off by means of the scraper blade 121 which then directs the meat particles into the collector box 126.

It should be understood that the above described embodiment of the invention may be varied in many ways without departure from the basic inventive concepts shown herein. For example, almost any number of brush-knife driving means could be used to adapt the machine to clean bones of almost any given shape. Also a variety of shapes and sizes of brushes as well as cutter knives could be used to conform the sizes of various bones.

The material from which the various elements of the apparatus are constructed should generally be corrosion resistant and nonreactive towards food materials. Stainless steel for the conveyor belt surface and the collector drums is generally preferred. However, suitably plated steel parts could serve.

The brushes utilized in the present invention preferably have nylon bristles, although brushes made of bristle material such as stainless steel, natural bristle, or any other materials having sufficient stiffness and durability will serve. The thickness of the bristles as well as the length may vary according to the type and shape of bone surface being treated. In general, brushes having nylon bristles from about 0.015 to about 0.075 inch in thickness were found to operate most efficiently. The speed at which the brush rotates also varies according to the type of meat removal being performed; however, a peripheral brush speed of from about 1900 to about 2000 feet per minute used in the apparatus disclosed herein was found to be the most effective speed for efficient removal of meat. It is often found that when using nylon bristles of the thickness previously mentioned, excessively high speeds in the range of from 6000 to 8000 feet per minute often produces sufficient bristle deflection to nullify the brushing action. The spiral knives used in the loosening of sinew and pocket meat may have varying diameters depending on the configuration of the bone being operated on. Spiral knives having a diameter of from about 1 inch up to about 3 inches travelling at a speed of approximately 10 feet per minute was found to be satisfactory for most bones obtained from most species of meat producing animals.

It has also been found that the position of the rotating brushes relative to the bone surface being treated may influence the efficiency of the rotating brushes. Experimentation has shown that a brush mounted on its rotational axis at about 20° from the horizontal conveyor will often produce added brushing efficiency.

Obviously many modifications and variations of the invention as hereinbefore set forth may be made without departing from the spirit and scope thereof, and therefore only such limitations should be imposed as are indicated in the appended claims.

We claim:

1. An apparatus for recovering meat from bones which comprises: conveying means adapted to convey a bone having residual meat adhering thereto along a given path; a plurality of spaced brushing means positioned above said conveying means along said path; cutting means positioned above said conveying means in advance of at least one of said brushing means, said brushing and cutting means being adapted to collectively contact and strip substantially all of the residual meat from said bone; and receiving means to collect the meat stripped from said bone by said tools.

2. An apparatus for recovering meat from bones which comprises: an endless conveyor means adapted to convey a bone having residual meat adhering thereto in a given path; a plurality of rotating power driven brushing means positioned above said conveying means and at given intervals along the given path; at least one rotating power driven cutting means positioned above said conveying means and in advance of at least one of said brushing means, said plurality of brushing and cutting means being adapted to collectively contact substantially all of the meat bearing surfaces of said bone and to brush and cut the meat therefrom; and means to collect the meat as removed by said brushing and cutting means.

3. An apparatus for recovering meat from bones which comprises: an endless conveyor belt adapted to convey a bone having residual meat adhering thereto in a given path; a plurality of rotating power driven brushes and circular knives positioned above said conveying means and at given intervals along the given path, said plurality of brushes and knives being arranged and adapted to collectively contact substantially all of the meat bearing surfaces of said bone, whereby said brushes sweep said meat from said bone in a particulate state, and propel substantially all of said meat particles in a direction substantially outwardly from said conveyor; and rotating collection drums positioned to rotate about said bone, conveyor, and brushes and adapted to collect on the internal surfaces thereof said meat particles propelled outwardly by said rotating brushes.

4. An apparatus for recovering meat from bones which comprises: an endless conveyor belt adapted to convey a bone having residual meat adhering thereto in a given path; a plurality of rotating power driven brushes and circular knives positioned above said conveying means and at given intervals along the given path, said plurality of brushes and knives being arranged and adapted to collectively contact substantially all of the meat bearing surfaces of said bone, whereby said brushes sweep said meat from said bone in a particulate state, and propel substantially all of said meat particles in a direction substantially outwardly from said conveyor; cylindrical collector drums adapted to rotate about said bone, conveyor, and brushes and positioned to collect said outwardly propelled meat particles; and elongated scraping blades held in scraping relation with the internal surfaces of said collector drums to remove the meat particles adhering thereto, said blade being positioned to direct the removed meat particles downwardly to the surface of said conveyor belt.

5. The apparatus of claim 4 wherein the rotational axis of said rotating brushes are mounted at an angle of about 20° with respect to the surface of said conveyor belt.

6. An apparatus for recovering residual meat from bones, said apparatus comprising: an endless conveyor trained in a given path, said endless conveyor being adapted to serially transport bones in an upstanding attitude along said path; a plurality of rotatable meat stripping brushes positioned at intervals along said path above said conveyor, said brushes being arranged so as to collectively contact substantially all of the residual meat bearing surfaces of said bones, whereby said meat may be stripped therefrom, as the latter are transported along said path; a plurality of revolvable collector drums disposed substantially axially in line with said path and spaced so as to envelop each of said brushes and portions of said conveyor path, and receive meat stripped from said bones, the number of said drums being equal to said brushes, scraper blades within said drums at a level adjacent one side of said conveyor, said blades acting to remove stripped meat from the interior of said drums and deposit such meat along said one side of said conveyor; and at least one rotatable knife means positioned along said path above said conveyor in advance of one of said brushes, said knife means being arranged to contact and loosen, by cutting action at least a portion of said residual meat clinging to each of said bones.

7. An apparatus for recovering meat from bones which comprises: an endless conveyor belt adapted to run in a given path; a plurality of driving lugs affixed to the outer surface of said conveyor belt and adapted to engage and push a bone having residual meat adhering thereto along said given path; a pair of guide rails extending in a direction coinciding with said given path, and positioned above said conveyor belt and in contact with said bone for purpose of guiding said bone along said path; a plurality of rotating power driven brushing and cutting means positioned above said conveying means and at given intervals along the given path, said plurality of brushing and cutting means being adapted to collectively contact substantially all of the meat bearing surfaces of said bone and to brush and cut the meat therefrom; and means to collect the meat as removed by said brushing and cutting means.

8. An apparatus for recovering residual meat from bones, said apparatus comprising: an endless conveyor trained in a given path, said endless conveyor being adapted to serially transport bones in an upstanding attitude along said path; a plurality of rotatable meat stripping brushes positioned at intervals along said path above said conveyor, said brushes being arranged so as to collectively contact substantially all of the residual meat bearing surfaces of said bones, whereby said meat may be stripped therefrom, as the latter are transported along said path; and at least one rotatable knife member positioned along said path above said conveyor in advance of one of said brushes, said knife being arranged to contact and loosen, by cutting action, at least a portion of said residual meat clinging to each of said bones.

References Cited in the file of this patent

UNITED STATES PATENTS

| 2,798,251 | Lott | July 9, 1957 |
| 2,897,536 | Bergstrom et al. | Aug. 4, 1959 |
| 2,932,058 | Childers | Apr. 12, 1960 |
| 2,932,060 | Massengill | Apr. 12, 1960 |
| 2,978,739 | Goldberg | Apr. 11, 1961 |

FOREIGN PATENTS

| 561,246 | Germany | Oct. 12, 1932 |